United States Patent Office 3,557,068
Patented Jan. 19, 1971

3,557,068
THIOPHENE POLYMERS AND METHOD OF PREPARATION
Ludwig Konrad Huber, King of Prussia, Pa., assignor to Pennsalt Corporation, Philadelphia, Pa., a corporation of Pennsylvania
No Drawing. Filed Feb. 1, 1968, Ser. No. 702,203
Int. Cl. C08f 5/00
U.S. Cl. 260—79.7                    7 Claims

ABSTRACT OF THE DISCLOSURE

Polymers of thiophene and monoalkyl thiophenes comprised of from about 10 to about 150 thiophene monomer units are prepared by polymerization of the monomer in the presence of a catalytic amount of a hydrocarbon sulfonic acid. The polymers, which are essentially odorless and colorless, are self-curing and useful for preparing solvent-resistant coatings.

---

This invention relates to thiophene polymers and the method of their preparation. More particularly, this invention concerns solvent-soluble, intermediate-molecular weight, self-curing polymers of thiophene and alkyl-substituted thiophene monomers and a method of preparing the polymers by heating the monomers in the presence of a catalytic amount of hydrocarbon sulfonic acid.

Certain types of polymers of thiophene and processes for their preparation are described in the literature. H. D. Hartough and S. L. Meisel, U.S. Pat. No. 2,521,514, polymerize thiophene or alkyl-substituted thiophene in the presence of approximately 100 percent orthophosphoric acid to yield a very low molecular weight product made up principally of the trimer and pentamer of the particular thiophene reactant involved. These products are soluble in petroleum lubricating oil fractions and are useful as an antioxidant additive in such oils.

E. P. Rittershausen in U.S. Pat. No. 2,489,674 describes other methods of preparing low molecular weight thiophene polymers, i.e., having a molecular weight of about 200 to 500 and useful as plasticizers for vinyl resins. These products are obtained by polymerizing thiophene or alkyl-substituted thiophenes in the presence of silica-alumina or orthophosphoric acid as a catalyst.

G. C. Johnson et al. in the Journal of the American Chemical Society, vol. 72 (1950), pp. 1910–1912, and in U.S. Pat. No. 2,658,902 refer to the earlier preparation of amorphous, highly insoluble products obtained by the polymerization of thiophene by highly acidic materials. They then describe the products of thiophene and alkyl-substituted thiophenes formed in the presence of solid silica-alumina catalysts. These products are trimeric and pentameric derivatives of thiophene that also contain traces of dimeric material.

In the interest of brevity, the terms "thiophene," "thiophene polymers," and "polymers of thiophene" referred to herein are meant to include within their meanings unsubstituted thiophene and its polymers and the monoalkyl derivatives of thiophene and their polymers, said derivatives having one to 16 carbon atoms in the alkyl substituent such as, for example, 2-methyl thiophene, 3-methyl thiophene, 2-isopropyl thiophene, 2-tert-butyl thiophene, 2-t-amyl thiophene, 2-s-butyl thiophene, 2-s-hexadecyl thiophene, the mixed alkyl thiophenes derived from the olefins of cracked wax, and the like. Preferred are thiophene and the lower alkyl thiophenes, i.e., having an alkyl substituent of one to four carbon atoms.

In accordance with the present invention thiophene polymers are provided comprised of from about 10 to about 150 units of the thiophene monomer, preferably from about 20 to 120 monomeric units. The thiophene polymers embodied herein are solid materials having melting points in the range of between about 100° C. and 300° C. In contrast to the previously known low molecular weight oligomers of thiophene which present a very strong, unpleasant odor and the previously known high molecular weight polymers of thiophene which are darkly colored and essentially insoluble in common organic solvents, the new intermediate range molecular weight polymers of this invention are essentially odorless, nearly colorless, and soluble in various organic solvents, preferably chloroform and methylene chloride. The new polymers in the lower molecular weight ranges are also soluble in such solvents as benzene and dimethyl formamide.

The thiophene polymers embodied herein are prepared by heating thiophene monomer, or in the alternative, thiophene oligomers (e.g., dimeric, trimeric and pentameric thiophene), in admixture with a catalytic amount of a hydrocarbon sulfonic acid, for example, methane, sulfonic acid, p-toluene sulfonic acid, benzene sulfonic acid and the like, generally in such an amount that the mole ratio of thiophene to catalyst is about 25:1 to 50:1, although the amount of catalyst used is not particularly critical. The polymerization is effected by heating the thiophene-catalyst mixture, generally in the range of about 50° C. to about 150° C., preferably from 80° C. to 120° C. Usually, from about 5 to 20 hours of reaction are sufficient to attain the desired degree of polymerization. Any monomeric or oligomeric materials in the crude reaction mixture can be separated therefrom by extraction with a suitable solvent for the monomeric and oligomeric substances, for example, actonitrile or diethyl ether. The intermediate molecular weight product of this invention can be separated, if so desired, into various molecular weight fractions either by treating the polymer with an extractive solvent for the lower molecular weight material, e.g. dimethyl formamide or benzene; or by fractional precipitation of polymer by addition of acetone or acetonitrile to a solution of the polymer product in chloroform or methylene chloride.

The polymers of this invention have a combination of properties that makes them highly useful in the coatings field. The polymers are initially thermoplastic but are "self-curing," that is, they convert to cross-linked, high molecular weight, thermoset resins merely through the application of heat. The curing mechanism takes place slowly upon exposure to air at room temperature, i.e., on the order of about 5 days or more, but occurs rapidly at elevated temperatures, for example, in from about one to 30 minutes at 150 to 300° C. The cured resins are resistant to common solvents such as those previously mentioned. Moreover, the heat-cured polymers produce a coating that adheres tenaciously to metal substrates such as aluminum and steel. The thiophene polymers of this invention are also valuable because of their capacity for absorbing ultraviolet radiation. Maximum absorption occurs at about 243 m$\mu$ with a molar absorptivity of about 40–43 liters/cc. This property makes the thiophene polymer useful as a UV-absorbing additive in small amounts, e.g., 1 to 10%, for the widely used conventional plastic materials such as polyvinyl chloride, the acrylic resins, cellulose acetate and the like.

The following examples are presented to illustrate and clarify the invention and should not be construed to limit its scope as defined by the appended claims.

EXAMPLE 1

A stirred mixture of 21 parts by weight of thiophene and 0.95 part of p-toluene sulfonic acid was brought to reflux (84° C.) under a nitrogen blanket. The reaction mixture turned reddish brown and became increasingly thicker as reaction progressed. After 12 hours the mixture was cooled to room temperature and about 50 parts of acetonitrile was mixed therewith. The tan solid material that separated was washed several times with acetonitrile and dried under high vacuum at 25° C. to yield 13.2 parts of a light brown solid which was washed with warm (50° C.) dimethylformamide. The light tan residual material was identified as thiophene polymer having an average molecular weight of 1,078, corresponding to about 13 units of monomeric thiophene. The melting point of the polymer was approximately 180° C. Treatment of this product with hot benzene yielded an insoluble fraction identified as a polymer with a molecular weight of 6,184, corresponding to about 74 thiophene units; its melting point was approximately 270° C. Addition of acetone to the aforementioned dimethyl formamide washing solution caused the precipitation of a polymeric thiophene fraction with a molecular weight of 1,620 (19 units), melting point in the range 180–200° C.

All of the polymeric materials described above were soluble in chloroform at room temperature. The UV-absorptions of the polymeric fractions were very similar with an absorption maximum at about 243 mμ.

EXAMPLE 2

A mixture of 21 parts thiophene and 0.48 part of methane sulfonic acid was held at reflux (84° C.–93° C.) for 14 hours as described in the preceding example; during this period the reaction mixture became darker and more viscous. Washing the crude reaction mixture two times with 50 parts acetonitrile yielded 13 parts of light brown solid. Separation of this polymer into two molecular weight fractions was accomplished by fractionally precipitating the polymer from a solution in chloroform by the addition of acetonitrile. A portion of the higher molecular weight fraction was washed with hot benzene to leave a yet higher molecular weight material. The three fractions recovered above had the following characteristics.

| Molecular weight (thiophene units) | Melting point, ° C. |
|---|---|
| 2,080 (25) | Ca. 190 |
| 4,947 (59) | Ca. 230 |
| 10,000 (120) | Ca. 290–300 |

A sample of the polymer having the molecular weight of 4,947 was formed into a uniform coating about 5 mils thick on an aluminum sheet and cured by baking for several minutes at 220° C. The resulting yellowish transparent coating adhered tenaciously to the aluminum substrate. In contrast to the uncured polymer, the coating was insoluble in hot $CHCl_3$ and hot $CH_2Cl_2$ and also showed excellent resistance to other solvents at their boiling temperature, for example, water, acetone, ethyl acetate, ethanol, petroleum ether and benzene.

A portion of the polymer having a molecular weight of 2,080 was dissolved in $CHCl_3$ and the solvent permitted to evaporate therefrom in a petri dish. After the polymer residue sat for 7 weeks at room temperature, it was only mildly effected by extensive contact with chloroform indicating that the polymer had been "self-cured" exposed to air at ambient temperatures.

EXAMPLE 3

Trimeric thiophene was prepared according to the method described by S. L. Meisel et al., Journal of American Chemical Society, vol. 72, (1950) pg. 1910. A mixture of 252 parts of thiophene and 35 parts of concentrated phosphoric acid was heated at reflux with vigorous stirring for 11 hours. After removal of the excess thiophene by steam distillation, the residue was treated with diethyl ether. Removal of the ether from the extract yielded 46 parts of trimeric thiophene (B.P. 160° C. at 0.5 mm. Hg) which had a persistent unpleasant odor.

A mixture of 3 parts of the foregoing trimeric thiophene and 0.15 part of p-toluene sulfonic acid was heated at 100° C.–120° C. for 14 hours. Two fractions of thiophene polymers were recovered using the extraction techniques of Example 1. The average molecular weights were 3,635 (43 thiophene units) and 1,489 (18 units), and melting points ca. 220° C. and ca. 180° C., respectively. These polymers were useful for preparing self-curing coatings as described in the previous examples.

EXAMPLE 4

In accordance with the teachings of G. C. Johnson et al., in U.S. 2,658,902 and J. Am. Chem. Soc., vol. 72 (1950), pp. 1910–1912, 100 parts of thiophene and 80 parts of "Superfiltrol" silica-alumina catalyst were mixed to form a mud and allowed to stand for eleven days at 77 to 80° C. The mixture was slurried with benzene, and the product in benzene solution was separated from the catalyst by filtration. The benzene and unreacted thiophene were removed from the filtrate by distillation to leave 28.5 parts of a clear, orange-brown liquid residue corresponding to a 28.5% yield of thiophene derivatives. This product was separated into two fractions by distillation. The lighter fraction, boiling at 210° C. and 0.5 mm. Hg, was a malodorous liquid having a molecular weight of 213, corresponding to an average of 2.5 thiophene units. The other fraction of the product was a malodorous, orange-brown, viscous liquid having a molecular weight of 436, corresponding to 5.2 polymerized thiophene units. These low molecular weight, foul-smelling, liquid products were clearly distinguishable from the solid, essentially odorless products prepared in accordance with this invention.

I claim:

1. The method of preparing a polymer consisting of from about 10 to about 150 polymerized units of a thiophene monomer selected from the group consisting of thiophene and monoalkyl thiophenes having one to 16 carbon atoms in the alkyl group which comprises heating a material consisting essentially of compounds selected from the group consisting of said thiophene monomer and an oligomer thereof consisting of a dimer, trimer or pentamer of said monomer, in admixture with a catalytic amount of a hydrocarbon sulfonic acid selected from the group consisting of a lower alkane sulfonic acid and aryl sulfonic acid.

2. The method of claim 1 wherein the catalyst is methane sulfonic acid.

3. The method of claim 1 wherein the catalyst is p-toluene sulfonic acid.

4. The method of claim 1 wherein the catalyst is benzene sulfonic acid.

5. The method of claim 1 wherein the monomer is thiophene.

6. The method of claim 1 wherein the monomer is monoalkyl thiophene having one to 4 carbon atoms in the alkyl group.

7. The method of claim 1 wherein the polymer is comprised of from about 20 to 120 polymerized thiophene monomer units.

References Cited

UNITED STATES PATENTS

| 2,482,084 | 9/1949 | Caesar | 260—329 |
| 2,489,674 | 11/1949 | Rittershausen | 260—30.2 |
| 2,521,514 | 9/1950 | Hartough | 260—329 |
| 2,560,956 | 7/1951 | Johnson | 252—45 |
| 2,563,073 | 8/1951 | Schmerling | 260—332.5 |
| 2,658,902 | 11/1953 | Johnson | 260—329 |

OTHER REFERENCES

Hartough and Kosak, J. Am. Chem. Soc., 69, pp. 3093–3095 (1947).

JOSEPH L. SCHOFER, Primary Examiner

C. A. HENDERSON, JR., Assistant Examiner

U.S. Cl. X.R.

117—132; 260—13, 45.8, 88.3, 92.8

PO-1050
(5/69)

UNITED STATES PATENT OFFICE
CERTIFICATE OF CORRECTION

Patent No. 3,557,068         Dated    January 19, 1971

Inventor(s)    Ludwig Konrad Huber

It is certified that error appears in the above-identified patent and that said Letters Patent are hereby corrected as shown below:

Assignee, "Pennsalt Corporation" should read --Pennwalt Corporatio

Signed and sealed this 25th day of May 1971.

(SEAL)
Attest:

EDWARD M. FLETCHER, JR.
Attesting Officer

WILLIAM E. SCHUYLER, J.
Commissioner of Patent